Aug. 22, 1950          H. NOYES          2,519,393
BLADDER TYPE TANK OR CELL
Filed March 14, 1947          3 Sheets-Sheet 2
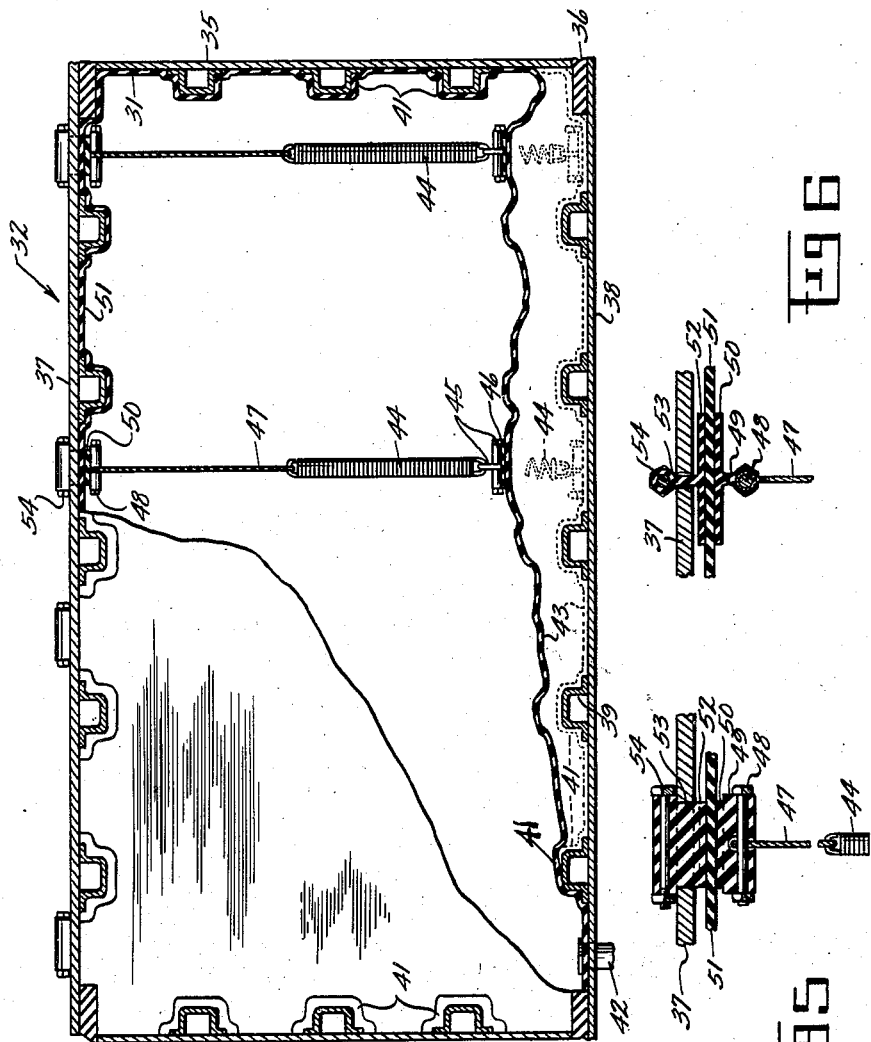
INVENTOR.
HOWARD NOYES
BY Wade Koontz
J. Daniel Sturse
HIS ATTORNEYS Aug. 22, 1950            H. NOYES            2,519,393
BLADDER TYPE TANK OR CELL
Filed March 14, 1947            3 Sheets-Sheet 3
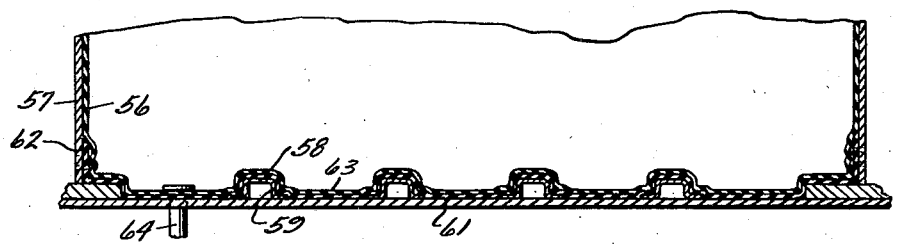
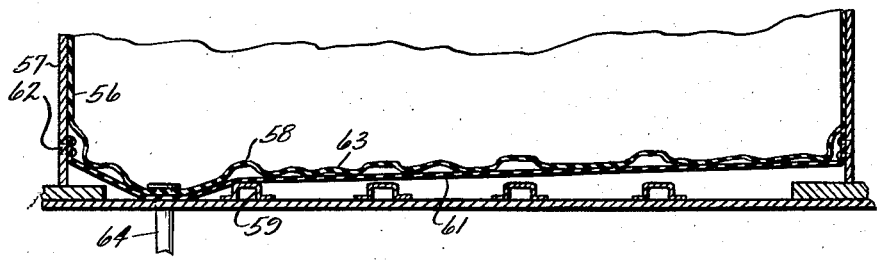
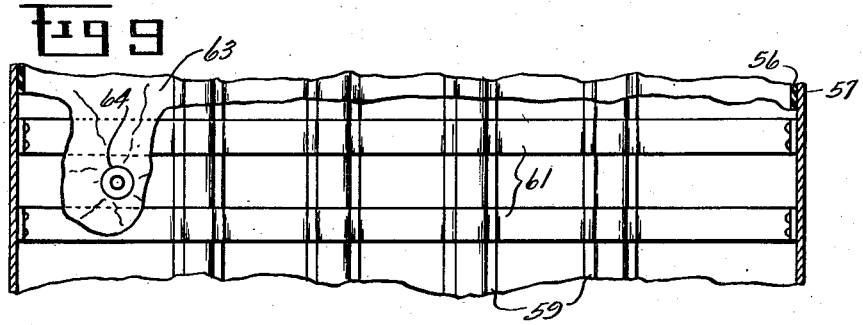
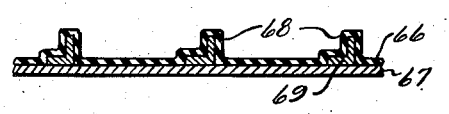
INVENTOR.
HOWARD NOYES
BY Wade Koontz
J Daniel Stuwe
HIS ATTORNEYS Patented Aug. 22, 1950

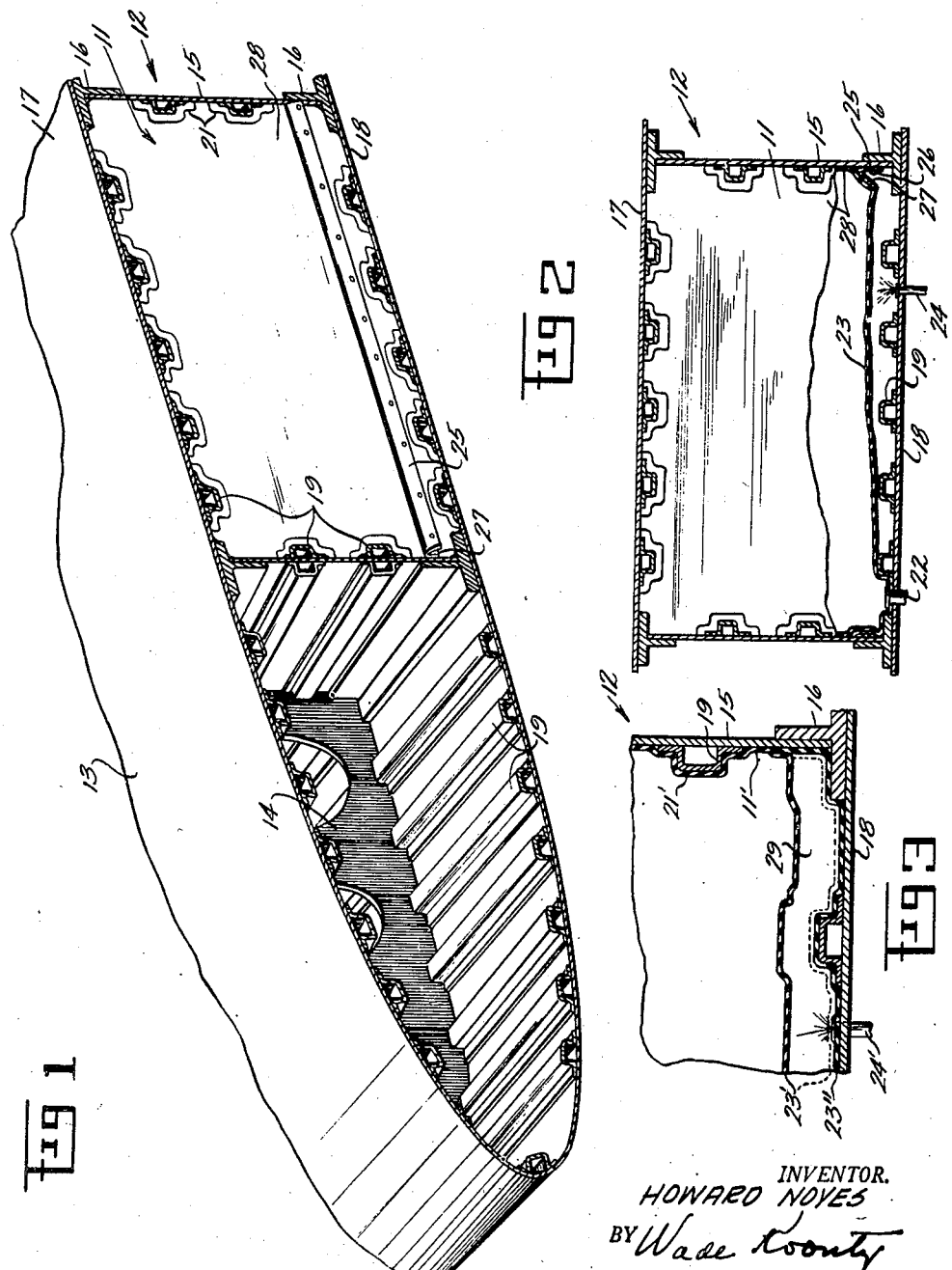

2,519,393

UNITED STATES PATENT OFFICE 2,519,393

BLADDER TYPE TANK OR CELL

Howard Noyes, Dayton, Ohio

Application March 14, 1947, Serial No. 734,841

9 Claims. (Cl. 244—135)

(Granted under the act of March 3, 1883, as amended April 30, 1928; 370 O. G. 757)

The invention described herein may be manufactured and used by or for the Government for governmental purposes without payment to me of any royalty thereon.

This invention relates to bladder type tanks or cells.

In aviation it has been customary heretofore to use a metallic tank built integral in combination with the interior part of an airplane structure, as in the wings and in the fuselage and the like, for carrying hydrocarbons such as fuel and lubricating oil. Tanks thus constructed have afforded realization of 100% capacity of the tank, but they have had the disadvantage of rapidly becoming subject to leakage, due to corrosion created in the tank metal and also due to loosening at the metal seams through rapid diving of the airplane and vibratory stresses. Such defects met considerable difficulties in having the necessary repairs promptly made. To provide proper sealants for such integral metal tanks has so far also failed of a satisfactory and full solution. Moreover, since such metal tanks and the aircraft structure in conjunction with which such tanks have been built generally comprise reinforcing ribs or stiffeners projecting inwardly from the interior sides of the skin or shell, the introduction of the conventional bladder type cell with its level exterior into such a metal tank compartment, encountered certain obstacles, since that required metallic or plastic bearing plates placed upon the inwardly extending edges of the reinforcing ribs to provide a smooth lining for safely supporting the thin flexible bladder type of cell. That then allowed room for only a smaller flexible inner cell within the main, interiorly ribbed metal tank, whereby the potential capacity of the closed inner cell, or the actual space to be utilized, became considerably reduced. On the other hand, if such prior bladder type inner tank was used alone within such ribbed outer tank, then a final quantity of fluid remained entrained in said inner tank, between said ribs at the bottom, so that it could never be entirely emptied.

It is an essential object of the present invention to provide an improved bladder type tank or cell whereby to overcome such defects and difficulties, and preferably to accomplish this by reconstructing and improving the ordinary plain bladder type fuel tank and providing a novel flexible bladder tank or cell which is especially arranged to fit snugly within the inner contour of the conventional interiorly-ribbed metal tank of an airplane wing or the like, whenever the cell is mainly filled, so as to utilize with this leakproof inner cell substantially all of the space available and to the full capacity of such metal tank.

Another object of this invention is to provide such a flexible inner cell which is preformed and shaped to include grooved or channeled portions which project inwardly from its skin and will normally fit snugly about the interior ribs provided in the ribbed outer metal tank, and remain seated thereon until the cell is nearly empty.

Another object of this invention is to provide a flexible inner cell which, although not equipped with inner grooved means, is made sufficiently elastic, or is made sufficiently over-sized, relative to the interior of the outer tank, so that the cell while mainly filled will fit snugly about the ribs and in the interior of the outer tank.

Another object of this invention is to provide a novel flexible inner tank or cell for mounting within an interiorly-ribbed outer tank, wherein means is furthermore provided to coact with said inner tank for elevating the bottom thereof above the ribs in the outer tank, when the contents in the inner tank become reduced below a certain head, for the purpose of emptying the contents substantially entirely from the cell bottom.

Another object of this invention is to provide such a flexible inner cell which, when filled above a certain head of fluid, will fit snugly within a ribbed outer tank to utilize substantially the entire inner space of the tank, and wherewith means is furthermore provided for elevating the bottom of the inner cell, as by the force of pneumatic pressure or liquid pressure, or by the use of mechanical means as springs or elastic means or the like, whenever said fluid in the cell drops below said head, so as to drain substantially all of the fluid from the cell.

These and various other objects and advantages are attained with this invention, as will become apparent from the following description, taken in connection with the accompanying drawings wherein the invention is shown in several of the preferred forms, it being evident that other arrangements and forms of construction may be resorted to in carrying out the objects and purposes of this invention.

In the drawings:

Fig. 1 is a partial perspective view of an airplane wing shown in section and containing a metal tank built into a part of its structure which has my invention applied thereto.

Fig. 2 is a vertical sectional view illustrating the inner cell fitting snugly within the interiorly ribbed metal tank, showing the front wall of the cell partly broken away and also showing one form of construction for raising the cell bottom above the tank ribs by means of pneumatic pressure.

Fig. 3 is a fragmentary view of this invention illustrating another form of construction for elevating the cell bottom by pneumatic pressure.

Fig. 4 illustrates this invention in another form, wherein interior springs are provided for elevating the bottom of the cell whenever the cell is nearly empty.

Figs. 5 and 6 are sectional detail views taken at right angles to each other, showing the means for securing the springs to the cell and the tank in the form of Fig. 4.

Figs. 7 and 8 are partial vertical sectional views showing this invention in another form, Fig. 7 showing it in position when the cell is filled above a certain head of fluid, and Fig. 8 showing it when the fluid in the cell has dropped below said head.

Fig. 9 is a partial plan view partly broken away of this last said form of the invention.

Fig. 10 shows a tank section containing the interior ribs in the form of angle bars, with my cell arranged to fit snugly with respect thereto.

In Fig. 1 of the drawings this invention is shown in the form of a bladder type tank or flexible cell 11, arranged to fit closely within the metal fuel tank 12 which is built in combination with the inner part of a wing structure 13 of an airplane. Said wing structure is generally provided with the customary cross plates or bulkheads 14 and also with plates or webs 15 extending parallel to the longitudinal axis of the wing and secured by the use of angle plates 16 to the top and the bottom parts 17 and 18, respectively, of the shell or skin of the wing and thus of the tank compartment. Reinforcing elements or stiffening ribs 19 usually extend inwardly in the tank, from the wing shell and from the plates, substantially as indicated in the drawings.

The above disclosed structure provides the conventional integral metal tank built into the wing structure of an airplane, which tank has heretofore been utilized for housing fluid hydrocarbon, but which it is found becomes rapidly subject to leakage.

As illustrated in the drawings, my novel bladder type inner tank or flexible cell 11 is constructed and arranged so as to fit snugly and closely into such an interiorly ribbed metal tank 12. This inner tank or cell 11 will be made in various forms to suit various conditions and to fit snugly in the tank. It may be made by preforming or shaping the cell so as to include grooves 21, which extend inwardly from the cell wall and which will then seat themselves neatly about ribs 19 to fit snugly about the same, as best shown in Fig. 1. This cell 11 may also be constructed without such preformed grooves, and may be made to contain sufficient elasticity, or it may be made sufficiently large or over-sized, so that it will seat itself properly about the ribs and also fit snugly within the interior contour of the tank whenever the cell within the tank is mainly filled, or at least contains a quantity of fuel therein extending above a certain head.

This improved cell is made of flexible material which will resist the effects of fluid hydrocarbon and will retain such fluid seal-tight in the cell; said material being made, for example, from flexible fabric impregnated with neoprene or with Buna-N rubber or the like.

In cooperation with this improved flexible inner cell as above described, in either of its forms, means is additionally provided for the purpose of elevating the bottom of the cell when the fluid therein has dropped below a certain head, or the tank is nearly empty, and a few of the various contemplated forms of such elevating means are illustrated in the drawings.

In Figs. 2 and 3 of the drawings two forms are shown wherein the bottom of the cell is elevated by means of fluid under pressure; while in Fig. 4 is shown a different form, for elevating the bottom of the cell by spring means; and in Figs. 6 to 9 is shown a further form wherein the cell bottom is elevated by strong elastic means positioned and functioning between the cell bottom and the tank ribs, said elastic means and said spring means and the fluid pressure being each of such force or loading as to elevate the cell bottom automatically above the tank ribs as soon as the fluid in the cell drops below a predetermined head, whenever the force of said elevating means overcomes the resistance of the cell bottom together with the weight of liquid resting on said bottom.

Referring to the form of this invention shown in Fig. 2 of the drawings, the flexible cell 11 is of the same general construction as that shown in Fig. 1, and it contains the usual outlet pipe or tube 22 adjacent one end of the cell and tank, which extends through the bottom 23 of the cell as well as through the bottom 18 of the tank, for conducting the fuel or other fluid from the interior of the cell. This tube or drain means 22 is also adapted to hold the outlet end part of the cell securely down on the bottom wall 18 of the tank 12, as shown in the drawings. An inlet pipe 24 is mounted in the bottom 18 of the tank, preferably near the side opposite said outlet tube 22, for admitting or conducting fluid under pressure, such as compressed air, steam or the like, into the lower part of the tank below the cell bottom, whereby to elevate said bottom. Such compressed fluid may be supplied from the air compressor, from the exhaust, or from the vacuum mechanism, etc.

A strap 25 of semi-flexible material is doubled over longitudinally and has one of its flaps secured with means 26 to the lower part of a web 15 of the tank, there being a strap 25 at the lower part of each side of the tank and cell. The free flap 27 of said doubled strap engages the lower part of the side wall 28 of the cell, near the bottom 23 thereof. Said flap 27 is sufficiently flexible so that it will remain in continual engagement with the cell and will be depressed along with the cell, as shown at the left-hand side in Fig. 2, when the fluid in the cell is above a certain head, and said flap 27 will also move upwardly along with the lower part of the cell when the bottom is elevated, as shown at the right-hand side of Fig. 2, whenever the fluid in the cell has dropped below said certain head. These straps are thus instrumental in providing an air retaining space between the cell bottom and the tank bottom, so as to retain the effect of the admitted fluid pressure confined underneath the bottom of the cell. The fluid pressure supplied through pipe 24 will be of such force as to raise the bottom 23 of the cell 11 above the tank ribs 19, at points or parts distant from the outlet tube 22, and substantially straighten out said bottom, about as shown in Fig. 2, whenever the fluid in the cell has dropped below the selected low head or is down near to said ribs, so that the remnant of fluid in the cell will then be drained substantially entirely out of the cell.

In Fig. 3 is disclosed a modified form for raising the cell bottom by fluid under pressure. Herein the cell 11' is substantially like the cell 11, but it is equipped with a double bottom or hollow lower wall including the inner bottom or upper layer 23' and the subjoined lower layer 23'', which layers are secured together adjoining the side wall parts of the cell. The pressure inlet pipe 24' provided herein conducts the compressed fluid into the chamber 29 formed between said two layers of this double wall. With this construction, when the cell is substantially filled or above a selected head of fluid, the upper layer 23' is forced downward, as shown in dotted outline in Fig. 3, so as to rest on the lower layer 23''; but when the cell is almost empty and the fuel head is nearly down to the ribs 19 on the tank bottom 18, then sufficient fluid pressure is introduced through pipe 24' into chamber 29 between said layers, so that the upper layer 23' is thereby elevated to the full line position as shown in said Fig. 3, to drain substantially all of the contents from the cell.

In Fig. 4 is disclosed a modified form which comprises spring means utilized for elevating the cell bottom when the fluid in the cell drops below the selected head. Herein the cell 31 is arranged to fit snugly in a fuel tank 32 which includes side walls 35, reinforcing bars 36, top and bottom walls 37 and 38, and reinforcing ribs 39, similar to the structure above described. This cell 31 may be also equipped with the grooved parts 41 for fitting more snugly about said ribs 39 and the fuel outlet tube 42 is provided for draining the cell.

In this form several springs 44 are provided which have their lower ends connected with the bottom 43 of the cell, as by link means 45 and a pad or patch 46 which may be vulcanized to the cell bottom. The upper ends of the springs are connected with and supported by the top wall 37 of the tank, as, for example, by means of a cable 47 or the like arising from each spring and being connected by a pin 48 to a neck 49 having a pad 50 thereon secured to a top wall 51 of the cell, while said top wall is furthermore secured to a pad 52 having a neck 53 supported by a pin 54 on the top wall 37 of the tank. These springs 44 are of such loading that they will automatically elevate the bottom 43 of the cell above the tank ribs 39, at the parts or points distant from the outlet tube 42, so as to tilt the bottom toward the tube, whenever the fluid in the cell drops below a certain head, whereby to drain the final remainder substantially entirely from the cell.

Another form of this invention is shown in Figs. 7, 8 and 9. In this form a flexible cell 56 is arranged to fit snugly in the tank 57, with the cell portions 58 fitting closely about the tank ribs 59, as shown in Fig. 7, while the fluid in the cell stands above a certain head, like in the above described form. Herein a taut but elastic diaphragm means is provided, which is shown in the form of taut elastic bands 61, spaced apart and secured at the ends to the lower part of the side webs 62 of the tank. These bands are of such force and loading that when the cell contains a quantity of fluid therein which stands above the certain head then these bands and the cell bottom 63 will remain depressed and fit closely upon the tank ribs 59, as shown in Fig. 7; but when the fluid in the cell is below said head or substantially empty then the bands 61 will become taut and shortened and will thus function to automatically elevate the cell bottom 63 above the ribs 59, at points distant from the outlet tube 64, substantially as shown in Fig. 8, so as to effectively drain the cell.

Fig. 10 illustrates how the fuel cell 66 is arranged to fit snugly in the tank 67, with the cell portions 68 made to fit closely about the ribs 69 in the tank which are herein provided in the shape of angle bars. Where the reinforcing ribs in the fuel tank consist of such angle bars, the utilization of my novel thin bladder cell will afford realization of practically the full capacity of the tank.

It should be noted that the term "tank" or "outer tank" as used herein, is meant to include, in addition to the usual metal fuel tank in an airplane, also any form of compartment located within or in association with the airplane structure and which can be adapted for safely housing such a flexible bladder type of cell for storing fluid material, such as fuel and the like.

I claim:

1. In a hollow airplane structure having rigid walls including stiffening members extending along said walls and projecting inwardly from the inner surfaces thereof, a fuel cell for installation within said structure having liquid-tight walls made of a flexible sheet material adapted to conform to the outlines of the inner surfaces of said structure and thus fit snugly therein when said cell is substantially full of fuel, a fuel outlet conduit extending to at least one point of the bottom wall of said fuel cell and having an end portion open to the interior of said fuel cell, and means operative to elevate the bottom wall of said fuel cell over a major portion of its area above the level of said stiffening members and above said open end of said conduit, to thus prevent pocketing of liquid fuel in portions of said bottom wall between said stiffening members and simultaneously promote complete draining of fuel from said fuel cell.

2. In a hollow airplane structure having rigid walls providing a fuel compartment with the bottom wall thereof having portions which are at a lower level than the remainder of said wall, a fuel cell for installation within said compartment and having liquid-tight walls made of a flexible sheet material adapted to conform to the outlines of the inner surfaces of said compartment and thus fit snugly therein when said cell is substantially full of fuel, a fuel outlet conduit extending to at least one point of the bottom wall of said fuel cell and having an end portion open to the interior of said fuel cell, and means responsive to a decrease in the weight of said fuel after partial emptying of said fuel cell to elevate the bottom wall of said fuel cell over a major portion of its area above said open end portion of said conduit to promote complete draining of fuel from said fuel cell.

3. In a hollow airplane structure having rigid walls providing a fuel compartment with the bottom wall thereof having portions which are at a lower level than the remainder of said wall, a fuel cell for installation within said compartment and having liquid-tight walls made of a flexible sheet material adapted to conform to the outlines of the inner surfaces of said compartment and thus fit snugly therein when said cell is substantially full of fuel, a fuel outlet conduit extending to at least one point of the bottom wall of said fuel cell and having an end portion open to the interior of said fuel cell, and spring means anchored to at least one portion of said bottom wall spaced from said open end portion of said conduit and responsive to a decrease in the weight of said fuel after partial emptying of said fuel cell to elevate the bottom wall of said fuel cell over a major portion of its area above said open end portion of said conduit to promote complete draining of fuel from said fuel cell.

4. In a hollow airplane structure having rigid walls including stiffening members extending along said walls and projecting inwardly from the inner surfaces thereof, a fuel cell for installation within said structure having liquid-tight walls made of a flexible sheet material adapted to conform to the outlines of the inner surfaces of said structure and thus fit snugly therein when said cell is substantially full of fuel, a fuel outlet conduit extending to at least one point of the bottom wall of said fuel cell and having an end portion open to the interior of said fuel cell, and means responsive to a decrease in the weight of said fuel after partial emptying of said fuel cell to elevate the bottom wall of said fuel cell over a major portion of its area above the level of said stiffening members and above said open end of said conduit, to thus prevent pocketing of fuel in portions of said bottom wall between said stiffening members and simultaneously promote complete draining of fuel from said fuel cell.

5. In a hollow airplane structure having rigid walls including stiffening members extending along said walls and projecting inwardly from the inner surfaces thereof, a fuel cell for installation within said structure having liquid-tight walls made of a flexible sheet material adapted to conform to the outlines of the inner surfaces of said structure and thus fit snugly therein when said cell is substantially full of fuel, a fuel outlet conduit extending to at least one point of the bottom wall of said fuel cell and having an end portion open to the interior of said fuel cell, and tension spring means anchored to said bottom wall and to a point thereabove responsive to a decrease in the weight of said fuel after partial emptying of said fuel cell to elevate the bottom wall of said fuel cell over a major portion of its area above the level of said stiffening members and above said open end of said conduit, to thus prevent pocketing of fuel in portions of said bottom wall between said stiffening members and simultaneously promote complete draining of fuel from said fuel cell.

6. In a hollow airplane structure having rigid walls including stiffening members extending along said walls and projecting inwardly from the inner surfaces thereof, a fuel cell for installation within said structure having liquid-tight walls made of a flexible sheet material adapted to conform to the outlines of the inner surfaces of said structure and thus fit snugly therein when said cell is substantially full of fuel, a fuel outlet conduit extending to at least one point of the bottom wall of said fuel cell and having an end portion open to the interior of said fuel cell, and a plurality of elastic bands extending under said bottom wall and anchored at the opposite ends to portions of said hollow airplane structure, said bands being under tension and being responsive to a decrease in the weight of said fuel after partial emptying of said fuel cell to elevate the bottom wall of said fuel cell over a major portion of its area above the level of said stiffening members and above said open end of said conduit, to thus prevent pocketing of fuel in portions of said bottom wall between said stiffening members and simultaneously promote complete draining of fuel from said fuel cell.

7. In a hollow airplane structure having rigid walls including stiffening members extending along said walls and projecting inwardly from the inner surfaces thereof, a fuel cell for installation within said structure having liquid-tight walls made of a flexible sheet material adapted to conform to the outlines of the inner surfaces of said structure and thus fit snugly therein when said cell is substantially full of fuel, a fuel outlet conduit extending to at least one point of the bottom wall of said fuel cell and having an end portion open to the interior of said fuel cell, and means for supplying fluid pressure under the bottom wall of said fuel cell after partial emptying of said fuel cell to elevate the bottom wall of said fuel cell over a major portion of its area above the level of said stiffening members and above said open end of said conduit, to thus prevent pocketing of fuel in portions of said bottom wall between said stiffening members and simultaneously promote complete draining of fuel from said fuel cell.

8. In a hollow airplane structure having rigid walls providing a fuel compartment with the bottom wall thereof having portions which are at a lower level than the remainder of said wall, a flexible fuel cell for installation within said compartment and having liquid-tight walls made of a flexible sheet material adapted to conform to the outlines of the inner surfaces of said compartment and fit snugly within the interior contour of the compartment, a drain tube extending from the bottom of the cell through said compartment bottom, and means carried by the compartment for elevating the cell bottom above said bottom wall portions which are at a lower level than the remainder of said wall at points distant from said tube to cause liquid drainage toward the tube, when liquid in said cell has dropped below a certain head, in order to substantially entirely drain said cell.

9. In a hollow airplane structure having rigid walls providing a fuel compartment with the bottom wall thereof having portions which are at a lower level than the remainder of said wall, a flexible fuel cell for installation within said compartment and having liquid-tight walls made of a flexible sheet material adapted to conform to the outlines of the inner surfaces of said compartment and fit properly within said compartment, a fuel outlet conduit extending to at least one point of the bottom wall of said fuel cell and having an end portion below the level of said remainder of the fuel compartment bottom wall, and means for elevating the bottom wall of said cell from the fuel compartment bottom wall and above said remainder of the fuel compartment bottom wall, whereby to effectively drain liquid fuel from the cell into said fuel outlet conduit.

HOWARD NOYES.

REFERENCES CITED

The following references are of record in the file of this patent:

UNITED STATES PATENTS

| Number | Name | Date |
|---|---|---|
| 810,403 | Fulton et al. | Jan. 23, 1906 |
| 1,279,089 | Dolbear | Sept. 17, 1918 |
| 2,102,590 | Gray et al. | Dec. 21, 1937 |
| 2,322,104 | Arcier et al. | June 15, 1943 |
| 2,361,148 | Paoli | Oct. 24, 1944 |
| 2,432,025 | Lorenz | Dec. 2, 1947 |